Warner & Tracy.
Revolving Rake.

N° 50525 — Patented Oct. 17, 1865.

Witnesses:

Inventor:

UNITED STATES PATENT OFFICE.

C. W. WARNER, OF WILLISTON, AND H. N. TRACY, OF ESSEX, VERMONT.

IMPROVEMENT IN HORSE-RAKES.

Specification forming part of Letters Patent No. 50,525, dated October 17, 1865

*To all whom it may concern:*

Be it known that we, C. W. WARNER, of Williston, in the county of Chittenden and State of Vermont, and H. N. TRACY, of Essex, in the same county and State, have invented a new and useful Improvement in Horse-Rakes; and we do hereby declare that the following is a full, clear, and exact description thereof, which will enable those skilled in the art to make and use the same, reference being had to the accompanying drawings, forming part of this specification, in which—

Figure 1:
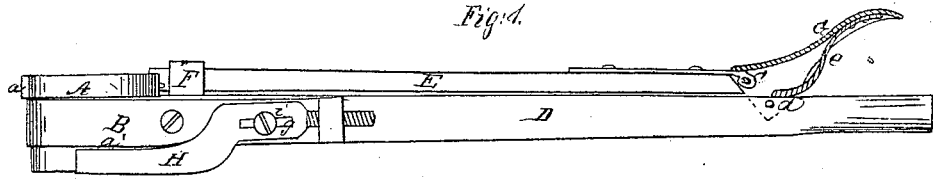
Figure 2:
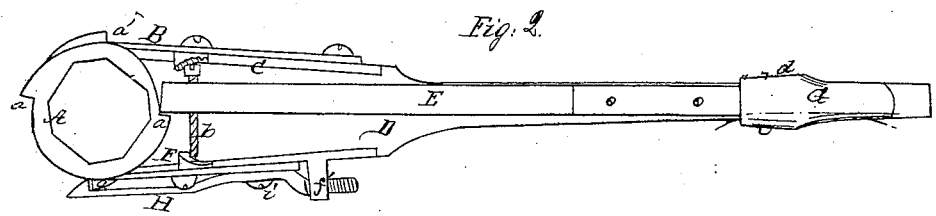
Figure 3:
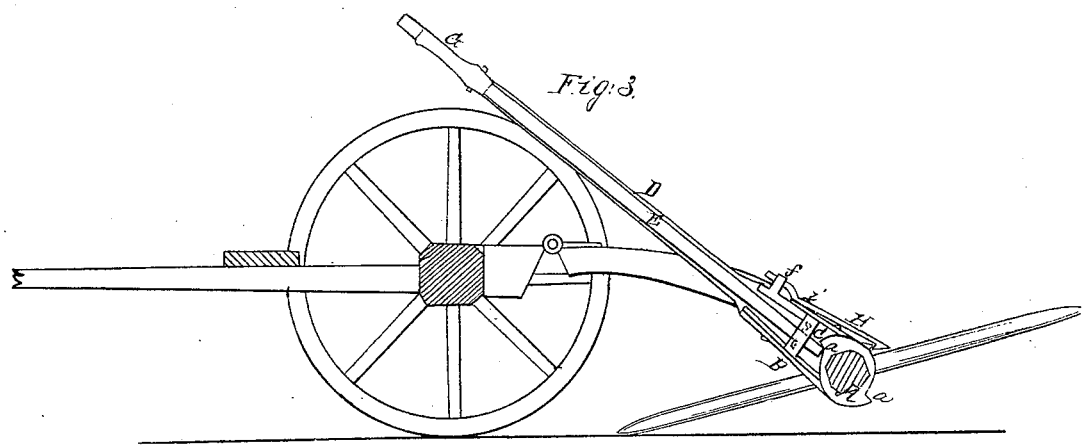

Figure 1 is a plan or top view of our invention detached from the rake; Figure 2, a side view of the same; Fig. 3, a diminished side view of the invention applied to a rake, the latter being shown in red.

Similar letters of reference indicate corresponding parts.

This invention relates to a new and useful improvement on a horse-rake for which Letters Patent were granted to C. W. WARNER, one of the present applicants, on the 15th day of November, 1864.

The invention consists in an improvement on the means employed for operating the rake so that it may discharge its load, whereby several advantages are obtained over the device for that purpose originally used.

A represents a metal socket, the interior of which is made or cast of such a form that it may be fitted snugly on the rake-head and turn therewith. This socket is fitted by means of a metal strap, B, to a metal plate, C, which is firmly secured to a lever, D, the socket being allowed to turn freely within the strap and plate. The socket A projects each side of the plate C and strap B, and has at each end of it two shoulders, $a\ a\ a'\ a'$, those, $a\ a$, at one end being in a line about at right angles with those, $a'\ a'$ at the opposite end.

E represents a sliding bar, which is placed at one side of the lever D, and is designed for a stop or catch for the shoulders $a\ a$ of the socket. This sliding bar, at its lower or outer end, works within a guide, F, and it has a screw, $b$, passing through it, by adjusting which the lower end of the bar may be raised or lowered within the guide, as will be fully understood by referring to Fig. 2. The upper end of the bar E is connected by a joint, $c$, with a hand-lever, G, which is pivoted to lever D, as shown at $d$, the lever G having a spring, $e$, bearing against its inner side, which spring has a tendency to keep the bar E under the shoulders $a$ of the socket. This bar E and the shoulders $a$ prevent the rake from turning or revolving while the latter is at work, as will be fully understood by referring to Fig. 3, (the rake being shown in red and arranged or applied to a mounted frame in precisely the same way as shown in the patented rake of Warner's, previously alluded to.)

On the top of the strap B there is secured a pawl, H, which engages with the shoulders $a'$ of the socket A. This is a pulling pawl, and it has a screw-thread cut on its rear end to screw into a nut, $f$, on the upper part of plate C. The pawl H also has an oblong slot, $g$, made in it, through which a screw, $i$, passes into the plate and secures the pawl in position. By this arrangement the pawl H may be readily adjusted relatively with the shoulders $a'$ of the socket A, so as to engage properly with said shoulders, and by means of the screw $b$ in bar E the latter may be adjusted higher or lower at its outer end, so as to have a proper relative position with the shoulders $a$.

In order to make the rake discharge its load the operator draws down the lever D, and the pawl H, in consequence of being engaged with one of the shoulders $a'$ of the socket A, will cause the front end of the rake-teeth to catch into the ground, and the rake will make a half-revolution, the socket A turning with the rake-head. By means of this half-revolution the rake discharges its load, and the former is arrested or stopped at the completion of each half-revolution in consequence of a shoulder, $a$, catching against the end of bar E.

It will be understood that when the lever D is drawn down in order to have the front of the rake-teeth catch into the ground the lever G is pressed inward toward lever D to draw forward bar E and liberate the collar A, to admit of the revolving of the rake. The pawl H catches into or over the shoulders $a'$ by its own elasticity.

This invention is a great improvement over the stops and catches fitted on the rake-head, as in the original patent of Warner's. The former is all complete within itself, and may be adjusted to and removed from the rake-head with the greatest facility.

We claim as new and desire to secure by Letters Patent—

1. The combination of the socket A, having two sets of shoulders, $a\ a\ a'\ a'$, the sliding bar F, and the pawl H, all arranged to operate as described.

2. Attaching of the pawl H to the strap B in the manner shown, or in any equivalent way, to render said pawl adjustable.

3. The screw $b$, or its equivalent, in the bar E, for the purpose of adjusting the latter, substantially as set forth.

C. W. WARNER.
H. N. TRACY.

Witnesses:
D. H. MACOMBER,
A. A. BLISS.